April 21, 1959 E. E. HEWITT ET AL Re. 24,636

HOSE CLAMP APPLYING MACHINE

Original Filed May 29, 1951 2 Sheets-Sheet 1

INVENTORS
Ellis E. Hewitt
Rankin J. Bush
William B. Jeffrey
BY
Frank E. Wilson
ATTORNEY

HOSE CLAMP APPLYING MACHINE

Original Filed May 29, 1951 2 Sheets-Sheet 2

INVENTORS
Ellis E. Hewitt
Rankin J. Bush
William B. Jeffrey
BY Frank E. Miller
ATTORNEY United States Patent Office Re. 24,636

Reissued Apr. 21, 1959

24,636

HOSE CLAMP APPLYING MACHINE

Ellis E. Hewitt, Ruffsdale, Rankin J. Bush, Jeannette, and William B. Jeffrey, Irwin, Pa., assignors to Westinghouse Air Brake Company, a corporation of Pennsylvania Original No. 2,729,994, dated January 10, 1956, Serial No. 228,894, May 29, 1951. Application for reissue January 24, 1958, Serial No. 711,543

2 Claims. (Cl. 81—9.3)

Matter enclosed in heavy brackets [ ] appears in the original patent but forms no part of this reissue specification; matter printed in italics indicates the additions made by reissue.

This invention relates to a hose clamp applying machine and more particularly to a fluid pressure operated machine for applying a hose clamp of the character disclosed in United States Letters Patent No. 2,312,575 issued to C. H. McKee, March 2, 1943, and assigned to Punch-Lok Company, Chicago, Ill.

A prime object of the invention is the provision of a fluid pressure operated machine which will perform the operation of tightening, locking, and removing excess strap material requisite to application of the hose clamp of the aforesaid McKee patent to a section of rubber hose for securing same to a nipple, coupling head or the like.

It is another object of the invention to provide a machine of the above character which will perform the above operations in proper sequential order automatically in response to momentary application of manual effort, such as tramping a foot pedal, punching a button, or the like.

Figures 1, 2:
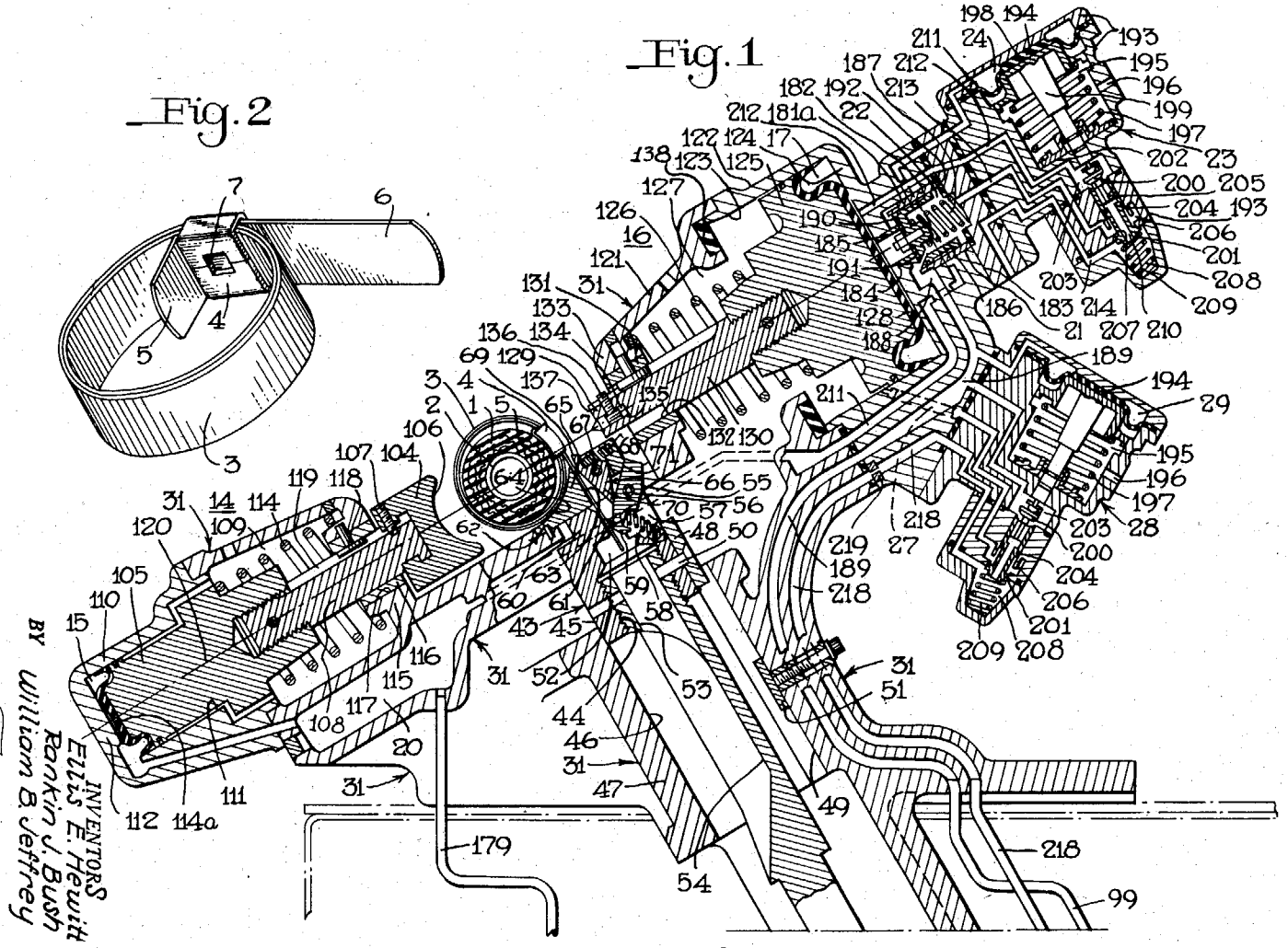
Figure 1A:
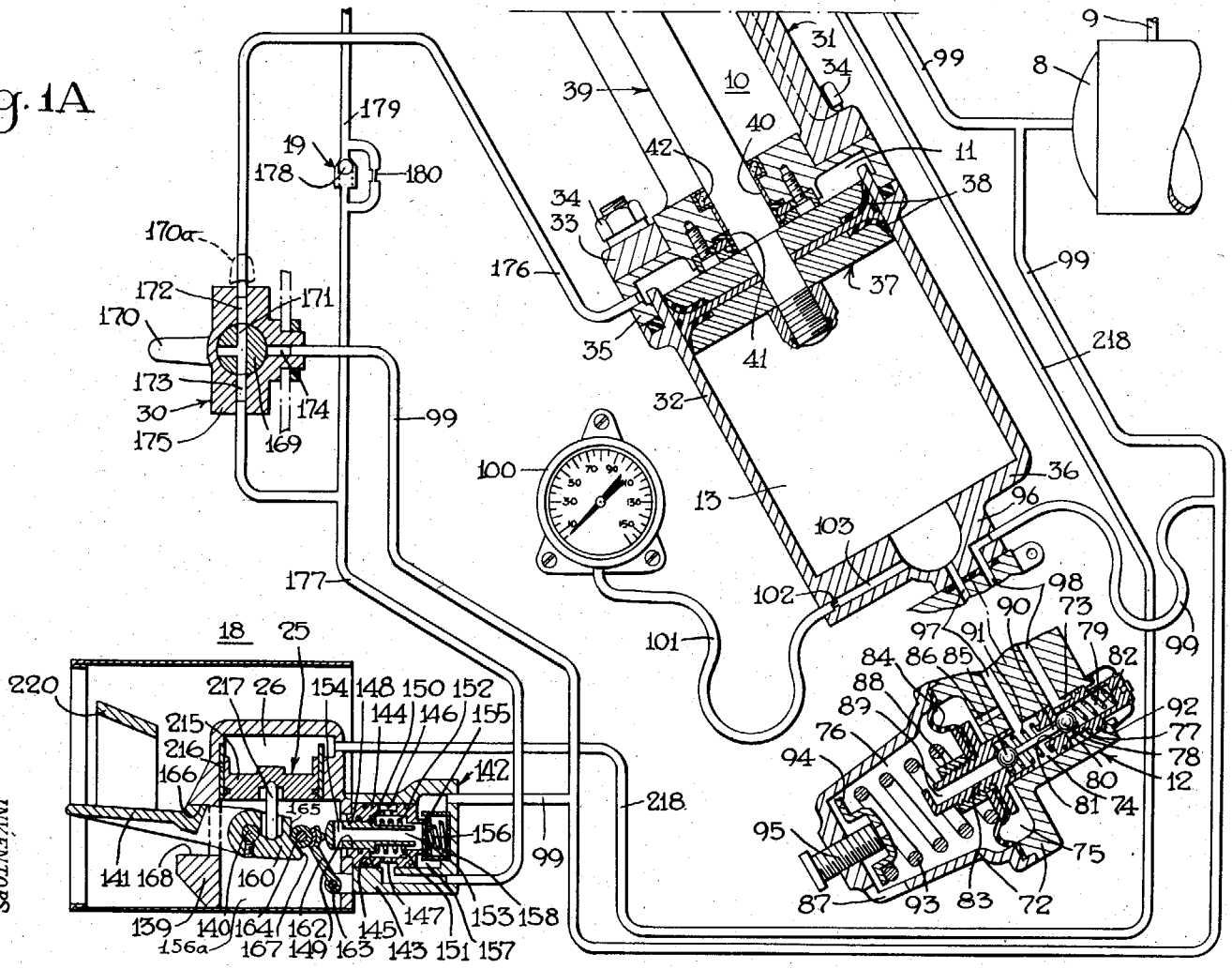

Other objects and advantages of the invention will become obvious from the following more detailed description taken in connection with the accompanying drawings in which Fig. 1 on Sheet 1 when matched with Fig. 1A on Sheet 2 constitutes an elevation view showing in cross-section the hose clamp applying machine embodying the invention; and Fig. 2 on Sheet 1 is a perspective view of a hose clamp of the aforementioned type.

GENERAL DESCRIPTION OF MACHINE

In the drawings, the hose clamp applying machine is shown with the slip noose type of hose clamp disclosed in the aforementioned McKee patent, hereinafter to be referred to in the specification and claims either as a McKee hose clamp or as a slip noose hose clamp, loosely fit around the end of a section of hose 1 in which is fit a metal nipple 2. Referring to Figs. 1 and 2, the slip noose hose clamp is made from a length of a pliable metal band, a portion of which is wound on itself to form a two-turn coil 3 of slightly larger diameter than the hose 1 to which it is to be tightened. The continuous turns are held initially in slidable engagement with each other to maintain the shape of coil 3 by a metal keeper strap 4 bent around the coil. The inner end of the continuous coil is bent back on itself to form a hook 5 to prevent same from slipping through the strap 4 when a tension force is applied to an outer extension 6 of the metal band to pull a portion of the outer turn of coil through the strap to tighten the coil onto the hose and thereby the hose onto the nipple. The portion of the strap 4 crossing over the inner turn of coil 3 is provided with a central opening 7 to allow for locking the clamp under tension onto the hose by a punch operation administered to the portion of the strap 4 which crosses over the outer turn of the clamp coil at a point in alignment with said opening. For particular details of the construction and function of the hose clamp, reference may be made to the previously mentioned McKee patent.

The hose clamp applying machine embodying the invention comprises a source of fluid under pressure such as a fluid pressure storage reservoir 8 adapted to be supplied with fluid under pressure from such as a compressor (not shown) via a pipe 9; fluid pressure hose clamp tightening means in the form of a pull cylinder device 10 which is responsive to supply of fluid under pressure to a pressure chamber 11 to grip the McKee hose clamp extension 6, and while the keeper strap 4 is restrained from movement, to apply a tension force to said extension for tightening the clamp around the hose 1; means associated with the pull cylinder device 10 in the form of a regulating valve device 12 adjustable to vary pressure of fluid in a chamber 13 to control the effect of pressure of fluid in chamber 11 on operation of device 10 according to the degree of tension desired to be applied to the hose clamp extension strap; fluid pressure hose clamp back-up means in the form of a back-up cylinder device 14 which is operable in response to supply of fluid under pressure to a pressure chamber [1] *15* to move into engagement with the hose clamp encircling the hose to brace and absorb shock imposed thereto during operations performed by the machine; fluid pressure clamp locking means in the form of a fluid pressure punch-and-hammer cylinder device 16 which is operable in response to supply of fluid under pressure to a pressure chamber 17 to effect application of a punching and a hammer blow to the keeper strap 4 on the slip noose clamp to lock the tightened clamp onto the hose and to remove the extension 6 in rapid succession in that order; manually operable means in the form of a foot operated valve device 18 which is operable to a supply position to effect supply of fluid under pressure from the reservoir 8 to the pressure chamber 11 for operating the pull cylinder device 10 and to the pressure chamber 15 for operating the back-up cylinder device 14; fluid pressure timing means in the form of a choke in a choke-and-check valve device 19 and a volume chamber 20 to reduce the rate of build-up of pressure in pressure chamber 15 relative to the rate of build-up in pressure chamber 11 to assure completion of a portion of the clamp-tightening operation prior to introducing the back-up operation; quick supply means in the form of snap-acting piston valve assemblage 21 which is responsive to venting of fluid under pressure from a chamber 22 rapidly to establish a large flow capacity communication between the reservoir 8 and the pressure chamber 17 to assure quick hammer-like action operation of the fluid pressure punch-and-hammer cylinder device 16; fluid pressure control means in the form of a relay valve device 23 operable to vent the chamber 22 upon attainment of a certain pressure of fluid in pressure chamber 15 as reflected in a control chamber 24 corresponding to the back-up cylinder devices attaining its clamp-back-up position; piston means 25 associated with the foot operated valve device 18 operable to return said device 18 to a release position in response to supply of fluid under pressure to a pressure chamber 26; means in the form of a port 27 associated with the punch-and-hammer cylinder device 16 to effect supply of fluid under pressure to pressure chamber 26 at completion of the cycle of hose clamp applying operations; protection means in the form of a relay valve device 28 responsive to an undesirable reduction in pressure of fluid in the reservoir 8 as reflected in a control chamber 29 to effect supply of fluid under pressure to the pressure chamber 26 to prevent operation of the foot operated valve device 18 and thereby the machine until the desired pressure has been reestablished in the reservoir 8, thus preventing operation of the machine at ineffective pressures; means in the form of a selector valve device 30 to effect supply of fluid under pressure to the pressure chamber 11 independently of pressure chamber 15 when desired to operate the pull cylinder device 10 independently of the back-up cylinder device 14 and punch-and-hammer cylinder device 16; and means in the form of a body casing 31 for integrating the components of the machine in proper spaced relationship with each other and for mounting of the machine to a support.

The pull cylinder device 10 comprises a hollow casing 32 removably attached to a flange 33 formed in the body casing 31 by means of such as a plurality of cap-screw-and-nut assemblages 34. One end of the casing 32 is closed by a pressure head 35 which is clamped between the flange 33 and the casing 32 by action of the screw-and-nut assemblages, while the opposite end of the casing 32 is closed by an integrally formed pressure head 36. A pull piston 37, slidably disposed in casing 32, is subject opposingly to pressure of fluid in the pressure chamber 11 at one side and to pressure in a chamber 13 at the opposite side. Two oppositely arranged packing cups 38 are provided on the pull piston 37 to prevent leakage of fluid under pressure between pressure chambers 11 and 13 in either direction past the piston. The piston 37 is removably attached to one end of a pull rod 39 the opposite end of which pull rod is disposed outside casing 32 and carries the means for gripping the end of the hose clamp extension 6. The pull rod 39 is slidably and guidably supported within a central opening 40 extending from pressure chamber 11 through the pressure head 35. A resilient sealing ring 41 suitably attached to the pressure head 35 and encircling opening 40 slidably engages the outer surface of the rod 39 to prevent leakage of fluid under pressure from the pressure chamber 11. An annular lubricating swab 42 is provided to store and distribute lubricant to the pull rod 39.

A gripping head 43 is attached by means of screw threads 44 to the opposite end of the pull rod 39. An outer surface 45 of the head 43 slidably engages an inner surface 46 of a guide sleeve element 47 formed integrally with the body casing 31 to slidably guide reciprocating movement of the pull rod 39 with movement of the piston 37. A key 48, mounted on the outer surface of the head 43, slidably engages the side walls of a longitudinal groove 49 formed in the guide sleeve element 47 to prevent turning movement of the head 43 during its movement with pull rod 39 and piston 37. The key 48 is attached to the pull rod 39 by such as a rivet 50 inserted through aligned openings drilled after assembly. The key 48 projects only part way into the groove 49 so as to clear a tripping element 51 removably secured to the casing body 31 and disposed in said groove for reasons which will become apparent hereinafter.

The head 43 is provided with a longitudinal opening 52 extending therethrough which joins a central opening 53 through the respective end of the pull rod 39 to accommodate the hose clamp extension 6 inserted therein as will be described subsequently. The lowermost end of the opening 53 opens into a transverse slot 54 opening from one side into the side of the pull rod 39 and extending beyond the lowermost open end of the guide sleeve element 47. Such slot 54 allows the clamp extension 6 to drop out of the openings 52, 53 once such extension has served its purpose in the clamp tightening operation and is separated from the tightened and locked hose clamp, as will be described subsequently. The lowermost end of the slot 54 is extremely shallow so as to offer little obstruction to gravity ejection of clamp extensions.

A dog 55 pivotally connected by means of such as a pin 56 to the head 43 is disposed between two spaced apart support elements 57 only one of which shows in the drawing. A compression spring 58 is interposed between the dog 55 and a suitable portion of the head so as to urge the dog in a clockwise direction (as viewed in the drawing) about pin 56 to an angular position for causing engagement between teeth 59 on the dog and a face of the clamp extension 6 extending into the opening 52. A back-up element 60 provided the head 43 has a flat surface 61 against which the extension 6 is urged when engaged by the dog 55. In the raised position of the head 43, in which it is shown in the drawing, immediately adjacent to or in substantial engagement with an extension guide-and-back-up element 62 attached to the stationary casing body 31, the flat surface 61 is in alignment with a similar surface 63 formed in said element 62. The guide-and-back-up element 62 is provided with an arcuate surface 64 to accommodate the curvature of the coil 3 of the McKee hose clamp. The arcuate surface 64 intersects the guide surface 63 to form an integral acute projecting element 65 which is shaped to extend into the space between the outer periphery of the coil 3 and the extension 6 in the direction of the keeper strap 4.

The element 62 attached to the fixed casing body 31 also is provided with a stop element 66 which is pivotally connected thereto by means of such as a pin 67. A compression spring 68, cooperable between the stop element 66 and a suitable portion of the element 62, is arranged to urge the stop element 66 in a counter-clockwise direction (as viewed in the drawing) about the pin 67 to bring a stop shoulder 69 formed in element 66 into proximity of the extension 6 substantially at right angles to the flat surface thereof to offer obstruction to movement of the keeper strap 4 when the extension 6 is being pulled. In the raised position of the head 43, in which it is shown in the drawing, a portion 70 of the element 66 is urged into engagement with the dog 55 which in turn is urged by such engagement to a retracted position disposed away from the extension 6, which retracted position of the dog 55 is defined by its engagement with a fixed stop shoulder 71 formed in a portion of element 62 attached to the casing body 31. In such retracted repose position of the dog 55 as urged thereto by action of the spring 68 in opposition to action of the spring 58, the stop element 66 also assumes a repose position, defined by engagement with the dog 55 in its repose position, in which the stop shoulder 69 is disposed a certain distance away from the element 65 to allow for facile insertion of the extension 6 preparatory to operating the machine.

DESCRIPTION OF OPERATION OF THE PULL CYLINDER DEVICE 10

Assume that the pressure chamber 11 at one side of piston 37 in device 10 is void of fluid under pressure and that the pressure chamber 13 at the opposite side of said piston is charged with fluid at some pressure as determined by adjustment of the regulating valve device 12, as will be described in detail hereinafter, and that such pressure is ample to cause the device 10 to assume the position in which it is shown in the drawing with the piston 37 in its uppermost limit position holding the pull rod 39 and head 43 with its associated parts in corresponding positions in which the dog 55 is held in its retracted position in engagement with stop shoulder 71 by action of spring 68 on stop element 66 in its retracted position, in which both are shown in the drawing, to allow the free extension 6 of the untightened hose-clamp-hose-nipple assemblage to be inserted in the clearance space past the retracted members to a position in which it is shown in the drawing.

With the untightened hose-clamp-hose-nipple assemblage thus inserted in place on the machine as aforedescribed, supply of fluid to the pressure chamber 11 at a pressure in excess of that in pressure chamber 13 will cause the piston 37 to move downwardly in the direction of the chamber 13, taking with it the pull rod 39, attached head 43 and the dog 55 carried by the head.

The initial movement of the piston 37 in the direction of chamber 13 moves the dog 55 out of engagement with the portion 70 of the stop element 66, permitting the stop element 66 to be turned on pin 67 by action of spring 68 to bring stop shoulder 69 into proximity of the hose clamp extension strap 6 and permitting the dog 55 to be turned on pin 56 by the spring 58 to bring the teeth 59 into gripping contact with the extension strap 6.

Subsequent movement of the head 43 along with piston 37 in the direction of chamber 13, by virtue of gripping action of the dog engaging the extension strap 6, will cause turning movement of the hose-clamp-hose-nipple assemblage on element 62 forcing the projecting element 65 of element 62 more deeply into the recess between coil 3 and the extension strap 6 and bringing the outer cross portion of keeper strap 4 of the hose clamp into engagement with the stop shoulder 69 on stop element 66 carried by the fixed casing body 31.

With the hose clamp keeper strap 4 thus in engagement with stop shoulder 69, further movement of the head 43 and locked dog 55 in the direction of chamber 13 will pull a length of the outermost turn of coil 3 through the restrained keeper strap 4, thereby tightening the hose clamp onto the hose 1 and the hose in turn onto the nipple 2 until the resultant force of the pressure differential across piston 37 balances the resistance of the hose clamp to further tightening; at which time maintenance of such pressure differential is depended upon to maintain the hose clamp in its tightened state. With the extension strap 6 still attached to the tightened hose clamp, the dog 55 will be disposed in groove 49 a distance above tripping element 51. Once the extension strap 6 has been severed free of the tightened hose clamp proper as will be later described, and no longer restrained from further movement, such extension will be carried along with the head 43 in the grip of the dog 55 as the piston 37 again moves in the direction of chamber 13 under influence of predominant pressure in chamber 11. During such movement, one arm of the engaged dog 55 in traveling with clearance through groove 49 formed in guide sleeve 47 will strike the tripping element 51, causing the dog 55 to turn on pin 56 in opposition to action of the spring 58 and release its grip from the separated extension strap 6 which will then fall free through slot 54 in pull rod 49 into a waste receptacle (not shown) for subsequent removal from the machine.

Upon subsequent venting of fluid under pressure from the pressure chamber 11, fluid under pressure in chamber 13 will effect return of the piston 37 and head 43 to their uppermost repose positions aforedescribed in which the dog 55 and stop element 66 assume their retracted positions to allow for subsequent insertion of another extension 6 of the next untightened hose-clamp-hose-nipple assemblage to be processed by the machine.

DESCRIPTION OF REGULATING VALVE DEVICE 12

The regulating valve device 12 is provided to enable the pressure of fluid supplied to the pressure chamber 13 in device 10 to be varied as desired for the purpose of increasing or decreasing the effect that the particular pressure of fluid supplied to chamber 11 has on the pulling force exerted on various hose clamp extension straps of different size and thickness to assure adequate tightening of the hose clamp at the proper pulling force without danger of pulling the strap in two before same has served its useful function.

The regulating valve device 12 is preferably of the self-lapping type which will maintain delivery of a particular pressure for which it is adjusted regardless of any tendency for the pressure at the delivery point to fluctuate, as in its application with device 10 in which movement of the piston 37 in its pulling direction tends to compress the fluid in chamber 13 and thereby tend to increase its pressure in proportion to piston travel, similar to action of a piston return spring. By virtue of maintenance of constant pressure in chamber 13 regardless of piston travel, the pulling force exerted on a particular size hose clamp being employed on various size hoses with consequent fluctuations in the final drawn out length of extension strap may be controlled accurately with disregard to the various distances which the piston 37 travels to stretch out the strap, as would be necessary were the fluid in chamber 13 confined to act like the usual piston return spring.

For sake of illustration, schematically, the regulating valve device 12, constituting an adjustable means to vary and maintain pressure of fluid in the pressure chamber 13 according to condition of adjustment, may comprise a casing 72 having therein a fluid pressure supply chamber 73, a delivery chamber 74, a control chamber 75, and an exhaust chamber 76. A supply valve seat element 77 is adapted to cooperate with a supply valve 78 for controlling communication between the supply chamber 73 and the delivery chamber 74. The supply valve 78 may be in the form of a steel ball disposed within a cavity 79 formed in the seat element 77. The cavity 79 may be open by way of ports 80 to the supply chamber 73 and by way of a central opening 81 to the delivery chamber 74. A seat may be formed at one end of opening 81 against which the supply valve 78 may seat to close off the delivery chamber 74 from the supply chamber 73. A bias spring 82 is disposed in the cavity 79 and arranged to urge the supply valve 78 toward its seated position. A release valve seat element 83, secured for movement with deflection of a flexible diaphragm 84, is provided for accommodating a release valve 85 which is disposed in delivery chamber 74. The diaphragm 84 forms a partition within the casing and separates the control chamber 75 from the exhaust chamber 76. The control chamber 75 is constantly open to the delivery chamber 74 by way of a port 86, while the exhaust chamber 76 is constantly open to the atmosphere by way of a port 87 in the casing. Diaphragm 84, therefore, is subject opposingly to delivery pressure of fluid in control chamber 75 on one side and to atmospheric pressure in the chamber 76 on its opposite side. The release valve seat element 83 comprises a portion which extends through a central opening in the diaphragm 84 and into the exhaust chamber 76. A nut 88 is in screw-threaded attachment with such portion for removably securing the release valve seat element 83 to the diaphragm. A central exhaust opening 89 extends through the exhaust valve seat element 83 from the delivery chamber 74, at one end, to the exhaust chamber 76, at the opposite end, for communication of fluid under pressure from the former chamber to the latter. A valve seat is formed in element 83 at the delivery chamber end of the opening 89 to accommodate the release valve 85 for closing off the delivery chamber 74 from the exhaust chamber 76 via the opening 89. The release valve 85 is rigidly secured to the supply valve 78 by means of a small rod 90. A bias spring 91 is provided for urging the seat element 77 to a repose position in which it is shown in the drawing in engagement with an annular casing shoulder 92. A compression control spring 93 is disposed in the exhaust chamber 76 and arranged to act on the diaphragm 84 to oppose action of delivery pressure of fluid in the control chamber 75 acting on the opposite side of the diaphragm. One end of the control spring 93 abuts an adjustable spring seat element 94 carried by one end of a screw-threaded shaft 95 which may be turned into and out of the casing to advance and retract the spring seat element 94 toward and away from the diaphragm 84 to change the degree of precompression of the control spring 93 according to the degree of pressure desired to be secured and maintained in the delivery chamber 74.

The casing of the regulating valve device may be mounted at one end of the cylinder 32 of device 10 directly on a mounting base 96 formed integrally with the pressure head 36. Via registering ports 97 in such mounting base 96 and in casing 72, the delivery chamber 74 is constantly open to the pressure chamber 13 in the pull cylinder device 10, while registering ports 98 in base 96 and casing 72 constantly connect the supply chamber 73 of the device 12 to a supply pipe 99 having a connection with reservoir 8. A pressure gauge 100 having a fluid pressure connection with the pressure chamber 13 via a section of conduit 101, a choke 102 and a passage 103 in base 96, serves to indicate to an operator of the machine the degree of pressure attained in said chamber and thereby aids in adjustment of the device 12 to attain the desired degree.

OPERATION OF REGULATING VALVE DEVICE 12

In operation of the regulating valve device 12, assume the supply chamber 73 to be supplied with fluid under pressure from the reservoir 8 at a pressure in excess of or equal to any pressure to be delivered by device 12 with the supply valve 78 initially unseated. Fluid under pressure will flow from the supply chamber 73 via the unseated supply valve 78 and opening 81 in supply valve seat element 77 to the delivery chamber 74, thence, via ports 97, to the pressure chamber 13 in the pull cylinder device 10, and to the control chamber 75 in device 12 via the port 86, wherein the delivery pressure of fluid thus will increase. When the delivery pressure of fluid as registered in the control chamber 75 reaches a certain value sufficient to overcome the initial compression of the control spring 93, the diaphragm 84 will deflect in the direction of exhaust chamber 76, carrying the exhaust valve seat element 83 with it, allowing the supply valve 78 to seat in element 77 to close off delivery chamber 74 from supply chamber 73 as the supply valve 78 and exhaust valve 85 are urged by bias spring 82 to follow movement of the release valve seat element 83. At time of closure of the supply valve 78, a balance is attained between the delivery pressure experienced in the control chamber 75 acting on one side of the diaphragm 84 and the opposing action of the control spring 93 at the opposite side of the diaphragm so that further deflection of the diaphragm and movement of the release valve seat element will terminate at this time with both supply and exhaust valves 78 and 85 closed and the delivery pressure of fluid attained in pressure chamber 13 in device 10 in accord with the degree of initial compression of control spring 93 as determined by adjustment of threaded shaft 95. It will be appreciated that initially other delivery pressures may be attained by turning shaft 95 into or out of the casing 72 to increase or decrease the initial compression of the control spring 93, respectively, which will necessitate a greater or lesser delivery pressure, respectively, to be generated to deflect diaphragm 84 against opposition of such initial compression and effect closure of the supply valve 78 as above described. Once a delivery pressure condition has been established, same may be increased or decreased in like fashion by turning of shaft 95 with resultant unbalancing of the diaphragm 84 and deflection thereof in favor of unseating of the supply valve 78 or the release valve 85 until supply or release of fluid under pressure to or from the delivery chamber 74 reestablishes diaphragm equilibrium whereupon the respective valve will again become seated to hold the desired degree of delivery pressure attained.

During operation of the pull cylinder device 10 to tighten a hose clamp as aforedescribed, movement of the piston 37 in the direction of pressure chamber 13 will tend to compress the fluid in said chamber. As soon as such tendency results in a slight increase in pressure, such increase will be felt in the control chamber 75 of the regulating valve device 12 and will cause the diaphragm 84 to deflect in the direction of exhaust chamber 76, carrying the release valve seat element 83 away from the release valve 85 which is restrained from movement in such direction by action of the spring 91 on the supply valve seat element 77 through the seated supply valve 78 and attached stem 90. With the release valve seat element 83 thus disposed away from the release valve 85, the delivery chamber 74 is opened to exhaust chamber 76 via opening 89 to relieve any excess pressure which may tend to build up in pressure chamber 13. When the proper pressure in chamber 13 as called for by initial compression of the spring 93 is again attained, such pressure as experienced in control chamber 75 will allow deflection of the diaphragm 84 to return the release valve seat element 83 into engagement with the release valve 85 to prevent further release of fluid under pressure from pressure chamber 13.

Return of piston 37 in the direction of chamber 11 has a tendency to reduce the pressure of fluid in the pressure chamber 13 and such tendency, experienced by the regulating valve device 12 in a slight reduction in pressure of fluid in its control chamber 75, will allow the control spring 93 to deflect the diaphragm 84 in the direction of said control chamber and, through the medium of the seated release valve 85 and the stem 90, cause unseating of the supply valve 78 to allow for maintenance of the called-for pressure in chamber 13 through supply of fluid under pressure from chamber 73. Once the desired pressure has thus been reestablished, the diaphragm 84 will again be in equilibrium and deflect to allow the supply valve 78 to be seated by spring 82 for holding such desired pressure in the chamber 13 in device 10.

DESCRIPTION OF BACK-UP CYLINDER DEVICE 14

The back-up cylinder device 14 comprises an anvil member 104 which is actuated by a piston 105 to a position in engagement with the hose clamp of the hose-clamp-hose-nipple assemblage, once the keeper strap 4 of the hose clamp has been brought into engagement with shoulder 69 by operation of the pull cylinder device 10 aforedescribed, to prevent misalignment of said assemblage under influence of continued pulling effort exerted by device 10, and to back-up such assemblage preparatory to a punch-and-hammer operation performed by the device 16 to be described hereinafter. The anvil member 104 is provided with an arcuate, recessed surface 106 to assure substantial bearing contact with the outer periphery of the tightened hose clamp. The anvil member 104 is removably attached by means of such as a set screw 107 to one end of piston rod 108 the opposite end of which is suitably attached to the piston 105. A portion of the casing body 31 is formed to define a non-pressure chamber 109 at one side of the piston 105 and serves as a rigid connection between other parts of the machine for proper spaced relationships therewith. A cylinder casing 110 is removably attached by means (not shown) to the casing body 31 to provide a cylindrical wall 111 for slidable reciprocable engagement with the piston 105. An integral pressure head 112 formed in the cylinder casing 110 interrupts wall 111 at one end and serves to define the pressure chamber 15 at one side of the piston 105. The opposite end of the wall 111 opens to the non-pressure chamber 109 at the opposite side of the piston 105. A packing cup 114a, fit onto the end of the piston 105, cooperates with the cylinder wall 111 to prevent leakage of fluid under pressure from pressure chamber 15 past the piston 105 into the non-pressure chamber 109. A compression spring 114, disposed in the non-pressure chamber 109, is interposed between a non-pressure head 115 formed in casing body 31 and the piston 105 to urge the latter in the direction of the pressure chamber 15. The piston rod 108 extends through the non-pressure chamber 109 and through the non-pressure head 115 in slidable guiding support within a bushing 116 fit into a central opening 117 in said head. To prevent misalignment of the anvil member 104 with respect to the tightened hose clamp, the piston rod 108 to which the anvil member is attached is restrained from turning movement by a key 118 attached to the bushing 116 and projecting into a longitudinal groove 119 formed in said piston rod. An axis of symmetry 120 of the piston 105, piston rod 108 and anvil member 104, representing their path of receiprocal movement is arranged to intersect the keeper strap 4 of the hose clamp substantially at right angles to the longitudinal dimension thereof and equidistant its ends with the strap 4 engaging stop shoulder 69 under influence of the pull cylinder device 10 in order properly to back-up the hose clamp during subsequent locking and hammer operations delivered to the strap 4.

OPERATION OF THE BACK-UP CYLINDER DEVICE 14

With the pressure chamber 15 void of fluid under pressure, the compression spring 114 causes the piston 105 to assume a repose position defined by engagement of the packing cup 114a with a raised portion of the pressure head 112, in which position the anvil member 104 is disposed a distance away from the hose-clamp-hose-nipple assemblage when fed to the machine for processing. Upon establishment of a certain degree of pressure in the pressure chamber 15 sufficient to overcome action of the compression spring 114, the piston 105 will move in the direction of the non-pressure chamber 109 to actuate the anvil member 104 into back-up engagement with the tightened hose clamp. Upon subsequent release of fluid under pressure from the pressure chamber 15, the spring 114 will effect return of the piston 105 and anvil member 104 to the repose position previously defined.

According to a feature of the machine, hose-clamp-hose-nipple assemblages of different diameters may be processed on the same machine merely by untightening the set screw 107, removing the anvil member 104 from the end of piston rod 108 and substituting an anvil member of the proper size. By virtue of the stroke of the piston 105, no other changes need be made and the piston merely moves greater or lesser distances to move a particular anvil member into back-up position in engagement with the different sized hose clamps.

DESCRIPTION OF THE PUNCH-AND-HAMMER CYLINDER DEVICE 16

The punch-and-hammer cylinder device 16 for effecting a punching operation to the keeper strap 4 and subsequent removal of the extension 6 on a tightening slip noose hose clamp to complete the clamp applying operation, comprises a hollow base 121 formed in the casing body 31 for proper disposition of the device 16 relative to the other fixed components of the machine. The base 121 serves as a mounting support for a cylinder casing 122 removably attached thereto by suitable means (not shown). A cylinder wall 123 is formed within casing 122 which is open at one end to the interior of the hollow base 121 and closed at the opposite end by an integral pressure head 124. A piston 125 is slidably disposed in the casing 122 and subject opposingly to pressure of fluid in the pressure chamber 17, defined by the cylinder wall 123 and pressure head 124, on one side and the force of a compression spring 126 disposed in a non-pressure chamber 127 on its opposite side. A packing cup 128 is fit onto the piston 125 for slidable sealing engagement with the cylinder wall 123 to prevent leakage of fluid under pressure from chamber 17 past the piston to chamber 127. The piston 125 is operatively connected to a punch-and-hammer head 129 formed as an integral part of one end of a piston rod 130 attached at its opposite end to the piston 125. The piston rod 130 is slidably guided for reciprocal movement with the piston 125 by a bushing 131 fit into an opening 132 in an end wall 133 formed in the base 121 against which one end of the spring 126 abuts. The head 129 is provided with a punch pin 134 inserted in an opening 135 in the end of the head and locked in place by a set screw 136. One end of the pin 134 is blunt for engagement with the inner end wall of the opening in the head 129 to transmit shock thereto. The opposite end of the punch pin 134 is conical in shape for projection out of the opening in the head 129 beyond a blunt face 137 of said head. The punch pin 134, piston rod 130 and piston 125 have the same line of symmetry 120 as the aforementioned parts of the back-up cylinder device 14 so that the point of the punch pin 134 is on a line of travel which will intersect the keeper strap 7 of the McKee hose clamp substantially in the center of its outer face when the edge of the strap is held against the stop shoulder 69 by action of the pull cylinder device 10 on the extension strap 6. A resilient annular shock absorbing element 138 is mounted in the base 121 disposed in the path of travel of the piston 125 for shock absorbing engagement therewith should the machine be operated without a hose-clamp-hose-nipple assemblage in place.

OPERATION OF PUNCH-AND-HAMMER CYLINDER DEVICE 16

In operation of the punch-and-hammer cylinder device 16, assume that the hose clamp is being held in a tightened condition by action of the pull cylinder device 10 with the keeper strap 4 being held tightly against the stop shoulder 69. With the pressure chamber 17 void of fluid under pressure, the piston 125 will be caused by action of spring 126 to assume a repose position in which it is shown in the drawing defined by engagement of packing cup 128 with the pressure head 124 in which position the punch-and-hammer head 129 is disposed a distance away from the keeper strap 4.

When an adequate volume of fluid at sufficient pressure is supplied to the pressure chamber 17, the piston 125 will move rapidly in the direction of non-pressure chamber 127 in opposition to action of the spring 126, causing the punch-and-hammer head 129 to deliver a hammer-like blow to the keeper strap on the McKee clamp being held in its tightened condition by device 10. At the time of such hammer-like blow, initially, the projecting conical shaped end of the punch pin 134 will dent the outer layer of the strap 7 and the two turns of coil 3 to lock same in their tightened condition in accord with the teachings of the aforementioned McKee patent until the blunt end face 137 of head 129 strikes strap 4 and passes over the upper end of the tapered element 65 with substantial clearance, whereupon such blow causes a sudden build-up in tension stress in the extension 6 along a line of contact with the lower end of the outer layer of said strap 4 which results in tension failure and thus severance of such extension from the hose clamp coil at the keeper strap. During such punch-and-hammer blow operations, the back-up cylinder device 14 absorbs the shock of impact of the punch-and-hammer head on the hose clamp, while the tension held on the extension 6 by device 10 and the back-up action of the fixed element 65 behind the extension 6 aid the punch-and-hammer head in effecting severance of the extension 6 free of the tightened and locked hose clamp. The bottom of the face 137 on the punch and hammer head 129 is arranged to substantially coincide with the bottom of the keeper strap 4 when engaging same to assure that the extension 6 will be severed free at that point.

DESCRIPTION OF CONTROL MEANS 18

The foot operated valve device 18 controlling supply and release of fluid under pressure to and from the pressure chambers 11 and 15 in the pull and back-up cylinder devices 10 and 14, respectively, comprises a hollow casing 139 intended to be mounted adjacent to the machine and to which is pivotally connected by means of a pin 140 a foot pedal 141 for operating a control valve device 142 comprising a valve casing 143 mounted on the casing 139. The control valve device 142 comprises a fixed sleeve element 144 tightly fit into a valve casing bore 145 and provided with an annular groove in its outer periphery which is cooperable with the inner wall of bore 145 to define an annular delivery chamber 146 which is constantly connected by radial ports 147 to the interior of the sleeve element. A cylindrical valve seat element 148 is slidably disposed within a central bore 149 extending longitudinally through sleeve element 144. The valve seat element 148 is provided with an annular rib 150 in its outer periphery which projects radially outward with circumferential clearance into an inner annular groove 151 formed in sleeve element 144 into which ports 147 open. A portion of the outer periphery of the seat element 148 extending beyond the rib 150, reduced in diameter, accommodates encirclement by a compression spring 152 and projects with radial clearance into bore 149. One end of the compression spring 152 abuts an annular end wall of the inner groove 151 in sleeve element 144, while the opposite end of the spring 152 engages the inner annular face of the rib 150 which intersects with the reduced portion of the seat element 148. By virtue of such arrangement, the spring 152 acts to urge the seat element 148 toward a repose position, in which it is shown in the drawing, defined by engagement of the rib 150 with the opposite end wall of the sleeve's inner groove 151. The seat element 148 is provided with a central opening 153 extending longitudinally from the projecting end of its reduced portion into intersection with radial exhaust ports 154 at a closed end of said element. The radial exhaust ports 154 are so located in the seat element 148 as to be disposed outside the end of the bore 149 at least when said seat element is in its repose position as previously described. The end of the portion of the seat element 148 projecting with clearance into the bore 149 and defining the open end of the central opening 153 forms an annular seat rib for sealing engagement with a rubber-faced, disk-shaped supply valve 155 which is urged by a compression spring 156 toward a seated position, in which it is shown in the drawing, in engagement with an annular seat rib formed in the sleeve element 144 and encircling the respective open end of the bore 149 therein. In repose position of the seat element 148 its open end is disposed a distance away from the seated supply valve 155 so that the annular delivery chamber 146 is open to atmosphere via ports 147, groove 151 and bore 149 in sleeve element 144, and opening 153 and ports 154 in said seat element and a non-pressure chamber 156a formed in the casing 139 and open to atmosphere via the opening in said casing 139 through which the foot pedal 141 extends. The supply valve 155 is disposed in a supply chamber 157 formed in the casing 143 at one end of the sleeve's bore 149. The valve 155 is slidably guided at its outer peripheral edge by a guide member 158 disposed in the supply chamber.

The foot pedal 141 comprises a cam 160 disposed in non-pressure chamber 156a and integrally attached to said pedal via the opening in casing 139 for pivotal movement about pin 140 with corresponding movement of the pedal. The cam 160 operatively connects the foot pedal 141 to the valve device 142 through the medium of a cam follower assemblage comprising an arm 162 which is pivotally connected at its one end by means of a pin 163 to the casing 139. The opposite end of the arm 162 is shaped for suitable contact with the closed end of the valve device seat element 148 and carries a roller 164 for rolling engagement with the cam 160. The cam 160 is provided with a recessed surface 165 which is presented to the roller 164 when the foot pedal 141 is in a raised position in which it is shown in the drawing, defined by engagement of a portion of the foot pedal with a stop shoulder 166 formed in the casing. When the recessed surface 165 of cam 160 is presented to roller 164, the follower arm 162 will be disposed in the angular position in which it is shown in the drawing allowing the spring 152 in valve device 142 to maintain the seat element 148 in its repose position previously defined. The cam 160 is also provided with a raised surface 167 which gradually merges into the recessed surface 165 and which is gradually presented to the roller 164 as the foot pedal 141 is caused to assume a depressed position, opposite to that in which it is shown in the drawing, defined by engagement of a portion of the pedal with a stop shoulder 168 formed in the casing 139. When the raised portion 167 is presented to the roller 164, the follower arm 162 is caused to assume an angular position in which the seat element 148 of valve device 142 is depressed inwardly of the bore 149 to a position in which the supply valve 155 is unseated from the bushing element 144 by seating engagement with the end of the seat element 148; thereby closing off the delivery chamber 146 from atmosphere by way of the opening 153 in element 148, and opening said delivery chamber to the supply chamber 157 via bore 149 and the unseated supply valve 155.

DESCRIPTION OF SELECTOR VALVE DEVICE 30

The selector valve device 30 rendering it possible to operate the pull cylinder device 10 independently of the other parts of the machine simply comprises a rotary valve 169 adapted to be turned to either of two positions by means of a handle 170 to bring a passage 171 formed in the valve into connective registry with a delivery passage 172 and either a control passage 173 or a supply passage 174 formed in a casing 175 containing the valve. The delivery passage 172 is connected to the pressure chamber 11 in the pull cylinder device 10 by way of a pipe 176; the control passage 173 is connected to a branch of a pipe 177 other branches of which are connected to the choke-and-check valve device 19 and to the delivery chamber 146 of valve device 142 comprised in the foot operated valve device 18; and the supply passage 174 is connected to a branch of the supply pipe 99 in turn connected to reservoir 8.

DESCRIPTION OF CHOKE AND CHECK VALVE DEVICE 19

The choke-and-check valve device 19 simply comprises a check valve 178 which prevents flow of fluid under pressure past it from pipe 177 to a pipe 179 connected to volume chamber 20 and allows facile flow past it in the opposite direction, and a choke 180 which restricts flow of fluid under pressure from pipe 177 to pipe 179.

OPERATION OF SELECTOR VALVE DEVICE 30

In the position of handle 170 in which it is shown in the drawing, the pipe 176, open at one end to the pressure chamber 11 in the pull cylinder device 10, is connected to the pipe 177 from the foot operated valve device 18 so that control of operation of the device 10 is under dictates of the device 18, the device 30 merely serving as a junction of pipes 176, 177. In the other position of the handle 170 of device 30, indicated in the drawing by a dash outline 170a, the pipe 176 is connected to the supply pipe 99 so that fluid under pressure from reservoir 8 will flow directly to the pressure chamber 11 in the pull cylinder device 10 to operate same independently of the foot operated valve device 18, and such operation will have no influence on operation of the back-up cylinder device 14.

OPERATION OF THE PULL CYLINDER DEVICE 10 AND BACK-UP CYLINDER DEVICE 14 AS INFLUENCED BY OPERATION OF THE FOOT OPERATED VALVE DEVICE 18

With the foot pedal 141 of device 18 in its raised position in which it is shown in the drawing, the delivery chamber 146 consequently will be vented to the atmosphere via opening 153 and ports 154 in seat element 148 of valve device 142, as will be appreciated from previous description.

When the selector valve device 30 is in its normal position in which it is shown in the drawing, upon venting of the delivery chamber 146 in valve device 142 of foot operated valve device 18 the pressure chamber 15 in back-up cylinder device 14 will become void of fluid under pressure by virtue of its being vented to atmosphere by way of the volume chamber 20, the pipe 179, the check valve 178, and the pipe 177 connected to said delivery chamber 146, as also will the pressure chamber 11 in the pull cylinder device 10, being vented to atmosphere by way of the pipe 176, the selector valve device 30, and the pipe 177 connected to said delivery chamber 146. With their respective pressure chambers 11 and 15 void of fluid under pressure, both the back-up cylinder device 14 and the pull cylinder device 10 will be in their respective repose positions in which they are shown in the drawing as previously described.

Upon causing the foot pedal 141 of device 18 to assume its depressed position to establish connection between the delivery chamber 146 and the supply chamber 157 as previously described, fluid under pressure from the supply pipe 99 will flow via device 18 into the pipe 177, thence via selector valve device 30 and pipe 176, to the pressure chamber 11 in the pull cylinder device 10 to cause operation of same as previously described to tighten the untightened hose clamp assemblage being processed by the machine. At the same time, fluid under pressure supplied to the pipe 177 also will flow to the pressure chamber 15 in the back-up cylinder device 14 by way of the choke 180, pipe 179, and volume chamber 20. By virtue of the restriction imposed by choke 180 to flow of fluid under pressure from pipe 177 to pressure chamber 15 and the volume chamber 20 which also has to be filled along with the chamber 15, the fluid under pressure supplied without restriction from pipe 177 to the pressure chamber 11 in the pull cylinder device 10 will assure that the hose clamp back-up operation will be performed at the time that the keeper strap 4 is brought into engagement with the shoulder 69 to prevent tilting and misalignment of the hose-clamp-hose-nipple assemblage during subsequent tensioning by continued operation of the device 10.

DESCRIPTION OF SNAP-ACTING PISTON VALVE ASSEMBLAGE 21

The snap-acting piston valve assemblage 21 for effecting rapid admission of a sufficient quantity of fluid under pressure to the pressure chamber 17 to effect the previously described operation of the punch-and-hammer cylinder device 16, comprises a sleeve 181 press fit into a bore 182 formed in an integral portion of the pressure head 124 of device 161 and extending from a mounting face 183 to a coaxial bore 184 of lesser diameter opening centrally into the pressure chamber 17. A hollow cylindrical seat element 185, press fit into the bore 184, projects a short distance into the interior of the sleeve 181 for sealing engagement with a cup-shaped piston valve 186 slidably disposed in said sleeve. A compression spring 187 partially contained within the piston valve 186 cooperates with the casing to urge the piston valve toward seated sealing engagement with the projecting end of the seat element 185. The sleeve 181 does not extend to the end of the bore 182 that meets the smaller bore 184 so that the respective end of the sleeve opens into a fluid pressure supply chamber 188 which is constantly connected to the fluid pressure reservoir 8 by way of a cored passage 189 connected to a branch of the supply pipe 99. The piston valve 186 comprises an end wall 190 which includes a resilient washer member for sealing contact with the end of seat element 185 and a small port 191 opens through the end wall at a point outside the line of sealing contact which is in constant communication with the supply chamber 188 and with the previously mentioned chamber 22 containing spring 187 on the opposite side of the end wall 190.

OPERATION OF PISTON VALVE ASSEMBLAGE 21

Assume the pressure of fluid in chamber 22 to equal that in the supply chamber 188 by virtue of the small port 191 through the end wall 190 of the piston valve 186 with the result that spring 187 is effective to hold said valve seated on seat element 185 with pressure chamber 17 in the punch-and-hammer cylinder device 16 closed off from the supply chamber 188 by the seated valve. Upon venting of fluid under pressure from the chamber 22 at one side of the end wall 190 of the valve 186 the supply pressure of fluid in chamber 188 acting on the limited annular area of said end wall exposed to said chamber outside seat element 185 will cause the valve to unseat from element 185 against opposition of the spring 187. Upon initial unseating of the valve 186 from seat element 185, the entire surface of the end wall 190 becomes exposed to the pressure of fluid from chamber 188 moving into the interior of the seat element, with the result that the piston valve under the influence of such increased exposure will move rapidly to a fully open position defined by engagement with a shock absorbing washer element 192 to allow fluid under pressure from the supply chamber 188 to flow freely and rapidly via seat element 185 into the pressure chamber 17 to effect the previously described operation of the punch-and-hammer cylinder device 16.

Once the chamber 22 is closed off from the atmosphere, leakage of fluid under pressure from supply chamber 188 through the port 191 in the end wall of the valve 186 will allow the pressure to increase in chamber 22 until the pressure differential across the valve becomes such as will allow the spring 187 to return the valve into seating engagement with the seat element 185, again closing off the punch-and-hammer cylinder device's pressure chamber 17 from the supply chamber 188.

DESCRIPTION OF THE RELAY VALVE MEANS 23 CONTROLLING OPERATION OF THE PUNCH-AND-SHEAR CYLINDER DEVICE 16.

The relay valve means 23 for sake of illustration comprises a casing 193 in which is clamped a diaphragm 194. At one side of the diaphragm 194 there is the previously mentioned control chamber 24 adapted to be supplied with fluid under pressure for urging said diaphragm to deflect in the direction of a non-pressure chamber 195 at its opposite side. The chamber 195 is open constantly to atmosphere by way of a port 196 in the casing. A control spring 197 is disposed in the chamber 195 which is arranged to urge the diaphragm 194 in the direction of the control chamber 24, in opposition to action of pressure of fluid therein, toward a repose position in which it is shown in the drawing in engagement with a shoulder 198 formed in the casing. A stem 199 is secured for reciprocal movement with deflection of the diaphragm 194 for actuating valves 200 and 201. The stem 199 extends through the non-pressure chamber 195 and is slidably guided in a suitable bore opening through a partition 202 which separates the non-pressure chamber 195 from a chamber 203. The projecting end of stem 199 has an operative connection with the valve 200 which is disposed in the chamber 203. By reciprocal movement of stem 199, the valve 200 is brought into and out of seating engagement with a hollow cylindrical seat element 204 which is slidably disposed in a bore 205 extending through a partition which separates chamber 203 from chamber 206. Seat element 204 extends through the chamber 206 and through an opening 207 in a partition separating said chamber from a chamber 208 in which the valve 201 is disposed. The valve 201 is attached to the end of stem 204 and arranged to cooperate with a seat formed at one end of opening 207 to control communication therethrough between chambers 206 and 208. A bias spring 209 is arranged to urge the valve 201 to a seated position in which it is shown in the drawing. A central opening 210 extends longitudinally through the seat element 204, which, when valve 200 is unseated, connects the chamber 203 to the chamber 208, When valve 200 is seated, communication between these two chambers via opening 210 is terminated.

In the relay valve device 23, its control chamber 24 is connected via cored passages 211 to the volume chamber 20 associated with the back-up cylinder device 14; its chamber 203 is connected via cored passages 212 to the pressure chamber 17 in the punch-and-hammer cylinder device 16, its chamber 206 is connected via cored passages 213 to the chamber 22 in the valve assemblage 21; and its chamber 208 is connected to atmosphere via cored passages 214.

OPERATION OF RELAY VALVE MEANS 23 CONTROLLING OPERATION OF THE PUNCH-AND-SHEAR CYLINDER DEVICE 16

When the volume chamber 20 in the back-up cylinder device 14 is void of fluid under pressure with said device therefore in its previously described repose position in which it is shown in the drawing, the control chamber 24 in the relay valve means 23 connected to said volume chamber also will be void of fluid under pressure. When such control chamber 24 is void of fluid under pressure, the control spring 197 will be effective to hold the diaphragm 194 seated against shoulder 198 with the stem 199 consequently so disposed that valve 200 is held unseated and valve 201 therefore seated by action of spring 209. With valves 200, 201 unseated and seated, respectively, the pressure chamber 17 in the punch-and-hammer cylinder device 16 will be vented to atmosphere via the passages 212, chamber 203, the unseated valve 200, opening 210 in seat element 204, the chamber 208, and the passages 214, so that the punch-and-hammer cylinder device 16 will be in its previously described repose position in which it is shown in the drawing.

When the pressure of fluid in the volume chamber 20 and simultaneously in the pressure chamber 15 in the back-up cylinder device 14 increases to a value effective to cause the piston 105 and anvil member 104 to assume their operative back-up position in engagement with the tightened hose clamp, such pressure existing also in the control chamber 24 in the relay valve means 23 will cause the diaphragm to deflect against opposition of the control spring 197 to effect seating of the valve 200 on seat element 204 and through the seating engagement to move said seat elements to unseat the valve 201 attached to it. Upon seating of valve 200 and unseating of valve 201, the pressure chamber 17 in punch-and-hammer cylinder device 16 becomes closed off from the atmosphere via passage 212 and chamber 203 by the seated valve 200, and the chamber 22 in the valve assemblage 21 becomes vented to atmosphere by way of the passage 213, chamber 206, the unseated valve 201 and the passages 214; resulting in the previously described operation of the valve assemblage 21 to effect rapid supply of sufficient volume of fluid under pressure to operate the punch-and-hammer cylinder device 16 as previously described.

Again, upon venting of the volume chamber 20 in the back-up cylinder device 14 to return it to its repose position in which it is shown in the drawing as previously described, the pressure of fluid in the control chamber 24 in relay valve means 23 also becomes so vented via passages 211 connected to chamber 20, and the control spring 197 and bias spring 209 then will become effective to seat consecutively the valve 201 and unseat the valve 200 as previously described. With the valve 201 seated, the chamber 22 in the valve assemblage 21 becomes closed off from the atmosphere via passages 213 and chamber 206 by the seated valve 201 to cause the valve 186 in said assemblage to close off the pressure chamber 17 in the punch-and-hammer cylinder device 16 from the fluid pressure supply chamber 188 as previously described. Substantially at the same time, the unseating of the valve 200 will allow the fluid under pressure in the pressure chamber 17 in the punch-and-hammer cylinder device 16 to release to atmosphere by way of the passage 212, chamber 203, unseated valve 200, opening 210 in seat element 204, chamber 208, and passages 214 to allow the piston 125 and connected parts of said punch-and-hammer cylinder device to return to their repose position in which they are shown in the drawing, as previously described.

DESCRIPTION OF PISTON MEANS 25 ASSOCIATED WITH THE FOOT OPERATED VALVE DEVICE 18

The piston means 25 comprises a piston 215 which is slidably disposed in a suitable sleeve 216 mounted within a suitably evacuated portion of the casing 139. One side of the piston 215 is subject to pressure of fluid in the previously mentioned pressure chamber 26 suitably formed within casing 139. The opposite side of the piston 215 is subject to atmospheric pressure in non-pressure chamber 156a. A rod 217 is suitably arranged operatively to connect the piston 215 to the cam 160 in such a fashion that effort exerted on the piston in response to supply of fluid under pressure to the pressure chamber 26 will effect turning of the cam 160 and thereby the foot pedal 141 about pin 140 in a direction which returns the foot pedal to its release position in which it is shown in the drawing with the valve device 142 consequently positioned to release fluid under pressure from the pressure chambers 11 and 15 in the cylinder devices 10 and 14 as previously described to effect return to their respective repose positions.

Release of fluid under pressure from the pressure chamber 26 will terminate the effort exerted on piston 215 and will allow the foot pedal 141 to be tramped down to its depressed position to effect operation of the machine.

DESCRIPTION OF MEANS CONTROLLING OPERATION OF THE PISTON MEANS 25

The relay valve debice 28 provided for controlling operation of the piston means 25 may be substantially like the relay valve means 23 previously described except for connection of its various chambers so that, for sake of brevity, like parts will bear like reference numerals and detailed description will not be repeated herein. Tre control chamber 29 previously mentioned serves the same purpose in device 28 as the control chamber 24 serves in device 23.

In the relay valve device 28, its control chamber 29 is connected via a branch of the supply passage 189 to the supply pipe 99 from the reservoir 8; its chamber 203 is connected to a branch of the same passage 189; its chamber 206 is connected to the previously mentioned passage 27 which opens into the sylinder wall defined by the bore 123 in the punch-and-hammer cylinder device 16 at a point where such passage 27 will be open to chamber 127 and thereby to atmosphere when the piston 125 assumes its repose position in which it is shown in the drawing and will be open to pressure chamber 17 at the opposite side of the piston 125 when the piston is caused to move past the port at completion of its punch-and-hammer stroke during operation of the device 16 as aforedescribed; and, in relay valve device 28, its chamber 208 is connected to pressure chamber 26 above piston 215 associated with the foot operated valve device 18 by way of pipe and passage 218 and a choke 219.

OPERATION OF THE MEANS CONTROLLING OPERATION OF THE PISTON MEANS 25

When the pressure of fluid in the reservoir 8 is above a certain value sufficient to operate the machine in the proper manner, such pressure in existence in the control chamber 29 in the relay valve device 28 will be adequate to cause and maintain the respective valves 200 and 201 seated and unseated, respectively, by virtue of deflection of the respective diaphragm 194 in opposition to action of the respective control spring 197 and bias spring 209 as will be appreciated from previous description of the relay valve means 23. With the valves 200 and 201 in the relay valve device 28 seated and unseated, respectively, the respective chamber 208 will be cut-off from the chamber 203, hence from the fluid pressure supply passage 189, and such chamber 208, hence pressure chamber 26 above piston 25 associated with the foot-operated valve device 18, will be connected to the passage 27 associated with the punch-and-hammer cylinder device 16 by way of chamber 206, the unseated valve 201 and chamber 208 in the relay valve device 28, and the pipe and passage 218 connected to said chamber 208. So long as the pressure of fluid from reservoir 8 acting in the control chamber 29 in the relay valve device 28 is adequate to operate the machine properly, said relay valve device will maintain the pressure chamber 26, above piston 215 associated with the foot-operated valve device 18, connected to the passage 27 associated with the punch-and-hammer cylinder device 16, the connection afforded by the respective unseated valve 201 in relay valve device 28 merely acting as an open communication connecting chamber 26 to passage 27 so long as reservoir pressure is suitably maintained.

With pressure chamber 26 thus connected to the passage 27 via relay valve device 28 as above described, assume the punch-and-hammer cylinder device's piston 125 to be in its repose position in which it is shown in the drawing with passage 27 open to chamber 127 therefor, and assume the foot pedal 141 of valve device 18 has been caused to assume its depressed position by momentarily applied foot pressure, which position is opposite to that in which it is shown in the drawing, in engagement with shoulder 168 to effect operation of the machine through supply of fluid under pressure to the pull cylinder device 10 and to the back-up cylinder device 14, as previously described. In such depressed position of pedal 141, the piston 215 will be in its uppermost position opposite to that in which it is shown in the drawing, with the pressure chamber 26 above it vented to atmosphere by way of the pipe and passage 218, the relay valve device 28, passage 27, and chamber 127 in the punch-and-hammer cylinder device 16.

From previous description it will be appreciated that the punch-and-hammer cylinder device 16 will be brought into operation, in response to operation of the back-up cylinder device 14 as effected by virtue of the depressed position of the foot pedal 141, to complete a cycle of operation of the hose clamp applying machine in somewhat less than three seconds, during which time the foot pedal remains in its depressed position. At completion of the punch-and-hammer stroke of the piston 125, which marks such completion of a cycle of operation of the machine, the passage 27 then uncovered to chamber 17 will receive fluid under pressure therefrom which flows by way of the unseated valve 201 in the relay valve device 28 and the pipe and passage 218 to the pressure chamber 26 above the piston 215 causing same to return the foot pedal 141 to its release position in which it is shown in the drawing to terminate operation of the machine through release of fluid under pressure from the cylinder devices 10 and 14 which will also cause the relay means 23 to release fluid under pressure from the pressure chamber 17 in punch-and-hammer cylinder device 16 to allow for return of the piston 125 to its repose position, as will be appreciated from previous description, again connecting the passage 27 to atmosphere via chamber 127 to release fluid under pressure from the pressure chamber 26 above piston 215 in foot-operated valve device 18 by way of pipe and passage 218 and the unseated valve 201 in the relay valve device 23 to allow for subsequent depression of foot pedal 141 for repeat operation of the hose clamp applying machine. Thus it will be seen that at time of completion of a cycle of operations performed by the hose clamp applying machine, the foot pedal 141 automatically is returned by fluid under pressure to its release position to release fluid under pressure from the various cylinder devices in the machine preparatory to repeating the cycle of operations on another hose-clamp-hose-nipple assemblage.

The choke 219 in the pipe and passage 218 restricts the rate at which fluid under pressure from the pressure chamber 17 in punch-and-hammer cylinder device 16 is supplied as aforedescribed to operate the piston 215 to return pedal 141 to its release position so that such return if effected in opposition to pressure inadvertently exerted by the operator's foot will not be effected at such rate as will be objectionable to or endanger the operator of the machine.

The device 18 is further provided with an auxiliary element 220 integrally attached to and spaced above the foot pedal 141 to effect return of the foot pedal to its release position by upward exertion of foot pressure at any time during the cycle of operations performed by the machine to terminate such operations at that point and effect release of the respective cylinder devices involved.

According to a protection feature of the controls comprised in the machine, if the pressure in the reservoir 8 drops below the desired value requisite to properly operate the machine, such reservoir pressure as existing also in the control chamber 29 in the relay valve device 28 will allow the respective control spring 197 in said relay valve device to deflect diaphragm 194 to allow for seating of the valve 201 and unseating of the valve 200 with consequent supply of fluid under pressure from supply passage 189 via the unseated valve 200 and pipe and passage 218 to the pressure chamber 26 in device 18 to assure that the foot pedal will remain and/or be returned to its release position to prevent faulty operation of the machine.

Once the desirable reservoir pressure has been established, the relay valve device 28 again will assume its position connecting the pressure chamber 26 in foot-operated valve device 18 to the passage 27 for automatic control by punch-and-hammer piston movement as aforedescribed.

SUMMARY OF OPERATION OF THE HOSE CLAMP APPLYING MACHINE IN TOTO

Summarizing operation of the hose clamp applying machine constituting the subject matter of the invention, assume that the selector valve handle 170 of device 30 is positioned to connect the pressure chamber 11 in pull cylinder device 10 to the foot-operated valve device 18 for control thereby; assume also that the foot pedal 141 is in its raised position with the pressure chambers 11 and 15 in the pull and back-up cylinder devices 10 and 14, respectively, both vented to atmosphere; the chamber 11 by way of the pipe 176, aligned passages 171, 172, 173 in device 30, the pipe 177, and, in valve device 142 associated with device 18, the chamber 146, bore 149 and opening 153 and ports 154 in seat element 148 by virtue of the release position of the foot pedal 141, as will be appreciated from previous description; and the chamber 15 by way of the volume chamber 20, the pipe 179, check valve 178 and the same pipe 177 etc.

With the pressure chamber 11 in pull cylinder device 10 thus vented, the pressure of fluid in chamber 13 controlled by the adjustable regulating valve device 12 is effective to urge the piston 37 to assume the position in which it is shown in the drawing with the head 43 in its uppermost position in which both the dog 55 and stop element 70 cooperate to assume their retracted positions to allow for feeding of the extension strap 6 of an untightened hose-clamp-hose-nipple assemblage to be tightened, locked and the extension removed, as hereinbefore described in detail.

With the pressure chamber 15 in the back-up cylinder device 14 thus vented, such chamber will be void of fluid under pressure with the piston 105 and connected anvil head 104 in their respective repose positions in which they are shown in the drawing to allow for receipt of the hose-clamp-hose-nipple assemblage to be tightened etc., as hereinbefore described in detail.

With the volume chamber 20 void of fluid under pressure, so also will be the constantly connected control chamber 24 in the relay valve device 23 which consequently will be in the position in which it is shown in the drawing with its valves 200, 201 unseated and seated, respectively, venting the pressure chamber 17 in the punch-and-hammer cylinder device 16 to atmosphere by way of the unseated valve 200, the chamber 208 and passage 214, while the seated valve 201 allows pressure of fluid from chamber 188 at one side of valve 186 to build up via port 191 in chamber 22 at the opposite side of said valve which therefore will be held seated in the position in which it is shown in the drawing by action of spring 187, closing off the punch-and-hammer pressure chamber 17 from the supply chamber 188 as hereinbefore described in detail.

With the pressure chamber 17 in the punch-and-hammer cylinder device 16 thus cut off from the supply chamber 188 and vented to atmosphere via the relay valve device 23, the piston 125 will be in its repose position in which it is shown in the drawing uncovering passage 27 to the non-pressure chamber 127 and thereby to atmosphere, with the punch-and-hammer head 129 therefore in its retracted position to allow for feeding of the untightened hose-clamp-hose-nipple assemblage to the machine, as hereinbefore described in detail.

Assume also that the pressure of fluid in the reservoir 8 is at a desirable degree sufficient to properly operate the machine so that the pressure of fluid in the control chamber 29 in the relay valve device 28 will be adequate to hold the valves 200, 201 in seated and unseated, respectively, positions, opposite to those in which they are shown in the drawing, with the now vented passage 27 connected via the unseated valve 201 in said relay valve device and pipe and passage 218 to the pressure chamber 26 above the piston 215 in the foot-operated valve device 18 in its release position.

With the pressure chamber 26 thus connected to the passage 27 via the relay valve device 28, said chamber 26 will be vented at this time via said passage 27 and the non-pressure chamber 127 in the punch-and-hammer cylinder device 16.

With the pressure chamber 26 thus vented, same will be void of fluid under pressure so that there will exist at this time no pressure force acting on the piston 215 to oppose movement of the foot pedal 141 to its depressed position.

Assume now that a hose-clamp-hose-nipple assemblage like that shown in the drawing has been mounted in place on element 62 with the extension 6 inserted past the retracted stop element 70 and the dog 55 to the position in which it is shown in the drawing as hereinbefore described in detail.

Assume now that the foot pedal 141 is depressed to position the valve device 142 to effect supply of fluid under pressure to the pipe 177, as hereinbefore described in detail.

Such fluid under pressure thus supplied to the pipe 177 will flow to the pressure chamber 11 in the pull cylinder device 10 by way of the selector valve device 30 and pipe 176 to cause movement of the pull cylinder piston 37 in the direction of chamber 13 to cause the stop element 66 to move into slidable engagement with the extension 6 for abutting engagement with the keeper strap 4 of the hose clamp while the dog 55 engages and grips such extension 6 to pull the hose clamp tight around the hose as movement of the piston 37 continues until tension on extension 6 equals the pressure differential force across said piston as regulated by pressure regulating valve device 12, as hereinbefore described in detail.

At the same time, fluid under pressure supplied by device 18 to the pipe 177 will flow at a restricted rate via choke [188] *180*, pipe 179, and volume chamber 20 into the pressure chamber 15 in the back-up cylinder device 14 to cause same to assume its position in which the anvil member 104 engages the outer periphery of the hose clamp to prevent tilting and absorb shock of the subsequent punch-and-hammer operation; the choke 180 and volume 20 serving to control the rate of pressure build-up in chamber 15 relative to rate of pressure build-up in chamber 10 and thereby assure that hose clamp back-up is effected at the time that keeper strap 4 engages shoulder 69.

Once the pressure of fluid in the pressure chamber 15 in the back-up cylinder device 14 reaches the value corresponding to its assuming its back-up position in which anvil member 104 is engaging the hose clamp, and such pressure of fluid acting in the control chamber 24 of the relay valve means 23 thereby becomes effective to seat the respective valve 200 and unseat the respective valve 201, thereby venting the chamber 22 in the snap acting valve device 21 via the unseated valve 201 to cause the valve 186 rapidly to unseat from seat element 185 and allow fluid under pressure from the supply chamber 188 to flow into the pressure chamber 17 in punch-and-hammer cylinder device 16 to cause the piston 125 to effect delivery of the punch-and-hammer operation to the hose clamp which thereby is locked in its tightened state and its extension 6 removed; as hereinbefore described in detail.

Upon completion of the punch-and-hammer operation, the extension 6, being separated from the clamp proper, allows the pull cylinder 37 subjected to predominance in pressure in chamber 11 to move to its extreme limit position in the direction of chamber 13, during which movement an arm of the dog 55 strikes the stop element 51 to free the severed extension 6 from the grip of the dog, as hereinbefore described in detail.

At substantially the same time that the punch-and-hammer piston 125 completes its stroke and uncovers passage 27 to the pressurized chamber 17, fluid under pressure will flow via the relay valve device 28 to the pressure chamber 26 to cause the piston 215 to return the foot pedal 141 to its uppermost position in which it is shown in the drawing for effecting venting of the pipe 177 to atmosphere; as hereinbefore described in detail.

At completion of operation on the hose-clamp-hose-nipple assemblage, same may be removed from the machine for addition of another to be processed. With the pipe 177 vented via the foot-operated valve device 18 in its release position, fluid under pressure will release rapidly from the pressure chambers 11 and 15 in the pull and back-up cylinder devices at substantially the same rate by virtue of the check valve 178 by-passing the choke 180 to allow for return of both devices to the positions in which they are shown in the drawing and as previously described in detail.

When the pressure of fluid in the volume chamber 20 thus reduces via the pipe 177 a certain degree, the same reduction in the connected control chamber 24 in relay valve device 23 will allow springs 197 and 209 to seat and unseat valves 201, 200, respectively, to again close off the chamber 22 in the snap acting valve device 21 from the atmosphere by seating of valve 201 thereby allowing for the pressure in chamber 22 to build up via flow of fluid under pressure from chamber 188 through port 191 in the valve 186 so that spring 187 will seat said valve and close off the pressure chamber 17 in device 16 from supply chamber 188, preventing flow of fluid under pressure to chamber 17 as fluid under pressure releases therefrom via the unseated valve 200 in said relay valve device.

With fluid under pressure thus released from the pressure chamber 17 in the punch-and-hammer cylinder device 16, the piston 125 and punch-and-hammer head 129 will return to their repose positions in which they are shown in the drawing, and in which the passage 27 is again uncovered to the non-pressure chamber 127 to allow for release of fluid under pressure from pressure chamber 26 in the foot-operated valve device 18 so that same may again be depressed by foot pressure and held for effecting another cycle of operation performed by the machine.

Having now described our invention, what we claim as new and desire to secure by Letters Patent, is:

[1. Apparatus for removing the extension from a tightened hose clamp of the type described, said apparatus comprising in combination, a casing body adapted for fixed mounting, an immovable extension back-up element fixed to said casing body and tapered for projection between the outer surface of a hose clamp coil and its extension in the direction of its keeper strap, keeper strap stop means attached to said casing body and disposed adjacent to said extension back-up element to define a slot-and-guideway into which the free end of the hose clamp coil extension may be inserted for projection therethrough, movable pulling means carried by said casing body and normally disposed adjacent to the outlet side of said slot-and-guideway for gripping the projecting end of the coil extension and exerting a pulling force thereon, thereby bringing the extension dispensing end of the hose clamp keeper strap into engagement with said keeper strap stop means as the extension is tensioned, and blow dealing means disposed at the inlet side of said slot-and-guideway directed for movement transversely of the direction of projection of said slot-and-guideway past said back-up element with clearance to deliver a hammer blow to the outer face of the coil keeper strap immediately adjacent to its extension dispensing end while held in engagement with said keeper strap stop means under influence of tension applied to the extension, thereby causing a tension failure of said extension transversely along a line of contact with the lower end of the outer layer of the keeper strap due to the sudden build-up in tension stress in said extension resultant from said hammer blow.]

[2. The combination as set forth in claim 1, including yieldable coil back-up means movable to a position for back-up engagement with the hose clamp coil to absorb the effects of the hammer blow applied by said blow-dealing means to the coil keeper strap while permitting sufficient freedom of movement thereof relative to the projecting end of said extension back-up element necessary for such build-up in tension stress in said extension to sever same free of the coil.]

[3. The combination as set forth in claim 1, including means disposed in the path of travel of said movable pulling means to be engaged thereby upon separation of the tensioned extension from the hose clamp coil for effecting release of the separated extension and gravity ejection from said pulling means.]

*4. For use with a hose clamp of the type comprising a convoluted coil portion, a keeper strap retaining said portion, and an extension of the coil projecting substantially tangentially from the keeper strap: a fluid pressure controlled apparatus for severing said extension from the convoluted coil portion after tightening of the latter, said apparatus comprising, in combination, casing means comprising an extension back-up element so beveled as to project between and be engageable by the outer surface of the convoluted coil portion and the inner side of its extension; keeper strap stop means carried by said casing means and so disposed adjacent said extension back-up element as to provide therebetween a guideway into and through which the free end of the coil extension may project; movable pulling means carried by said casing means for gripping the coil extension adjacent its projecting end and exerting a pulling force thereon for thereby bringing the extension-dispensing end of the keeper strap into engagement with said keeper strap stop means and also tightening the convoluted coil portion as the coil extension is tensioned; and a direct-acting pneumatically actuated punch-and-hammer device having a normally vented chamber, said device comprising a piston rod having an axis substantially perpendicular to the wide dimension of the coil extension and to the direction of projection of the guideway, a punch-and-hammer head coaxially and immovably connected to one end of said piston rod and normally disengaged from the hose clamp, and a piston coaxially and immovably connected to the other end of said piston rod and responsive to supply of pneumatic fluid under pressure to said chamber, while the keeper strap is held engaged with said keeper strap stop means and the coil extension is maintained tensioned by action of said pulling means, to move said piston rod and punch-and-hammer head in a straight line along said axis with increasing velocity and with clearance past said extension back-up element for causing said punch-and-hammer head to strike the outer face of the keeer strap intermediate its ends at high momentum and thereby deliver directly from the piston to the keeper strap via said piston rod and head a direct-acting hammer blow which effects crimping of the keeper strap and also causes a tension failure of the coil extension in proximity of the extension-dispensing end of the keeper strap in consequence of the sudden build-up in tension stress in the coil extension resultant from said hammer blow.*

*5. The combination as claimed in claim 4, including a back-up cylinder device comprising a piston arranged coaxially with and at the opposite side of the hose clamp from said piston rod, an anvil member operably connected to the last-named piston for reciprocation thereby, the last-named piston being pneumatically actuatable, in a direction along said axis, for causing said anvil member to engage the side of the convoluted coil portion opposite the keeper strap and, by thus yieldably backing up said convoluted portion, absorb the effects of the hammer blow applied by said punch-and-hammer head to the keeper strap and at the same time permit a degree of movement of the keeper strap relative to the extension back-up element sufficient to enable the tension stress in said extension to build up to the extent necessary to sever the latter from the convoluted coil portion.*

References Cited in the file of this patent or the original patent

UNITED STATES PATENTS

| | | |
|---|---|---|
| 1,764,911 | Treat | June 17, 1930 |
| 2,054,248 | Eronen | Sept. 15, 1936 |
| 2,143,546 | Day | Jan. 10, 1939 |
| 2,150,234 | McKee | Mar. 14, 1939 |
| 2,312,400 | Govanus | Mar. 2, 1943 |
| 2,334,637 | McKee | Nov. 16, 1943 |

FOREIGN PATENTS

| | | |
|---|---|---|
| 595,841 | France | Oct. 9, 1925 |